(Model.)  3 Sheets—Sheet 1.

S. B. HART.
FORCE FEED FERTILIZER ATTACHMENT FOR GRAIN DRILLS.

No. 323,326.  Patented July 28, 1885.

WITNESSES:
E. L. Thurston.
P. Burbank

INVENTOR:
Stacy B. Hart
by Hill & Dixon
His Attorneys.

(Model.)　　　　　　　　　　　　　　　　　　3 Sheets—Sheet 2.
S. B. HART.
FORCE FEED FERTILIZER ATTACHMENT FOR GRAIN DRILLS.
No. 323,326.　　　　　　　　　Patented July 28, 1885.

WITNESSES:
E. L. Thurston
P. Burbank

INVENTOR:
Stacy B. Hart
by Hill & Dixon
His Attorneys.

(Model.) 3 Sheets—Sheet 3.

S. B. HART.
FORCE FEED FERTILIZER ATTACHMENT FOR GRAIN DRILLS.

No. 323,326. Patented July 28, 1885.

WITNESSES:
E. L. Thurston
P. Burbank

INVENTOR:
Stacy B. Hart
by Hill & Dixon
His Attorneys

UNITED STATES PATENT OFFICE.

STACY B. HART, OF PEORIA, ILLINOIS.

FORCE-FEED FERTILIZER ATTACHMENT FOR GRAIN-DRILLS.

SPECIFICATION forming part of Letters Patent No. 323,326, dated July 23, 1885.

Application filed June 5, 1884. (Model.)

*To all whom it may concern:*

Be it known that I, STACY B. HART, of the city of Peoria, in the county of Peoria and State of Illinois, have invented certain new and useful Improvements in Force-Feed Fertilizer Attachments for Grain-Drills, of which the following is a description, reference being had to the accompanying drawings, which is a part of this specification.

My invention relates to that class of force-feed fertilizer-distributers in which a series of horizontal knives convey the fertilizing material to the discharge-opening in the bottom of the hopper, from which it is conducted to the drill-teeth.

Devices of this class which have hitherto been constructed have proved unsatisfactory, because of the great liability of the fertilizing material, especially if it be at all moist, to clog or bank, and thus impede the working of the operating parts.

The object of my invention is to overcome this difficulty, and to provide a device which may be adjusted to feed the fertilizer in any desired quantity, and in which the feeding-knives shall be cleaned thoroughly during each revolution after performing their allotted work.

To this end it consists in the construction and combination of parts, hereinafter described, and pointed out definitely in the claims.

Figure 1:
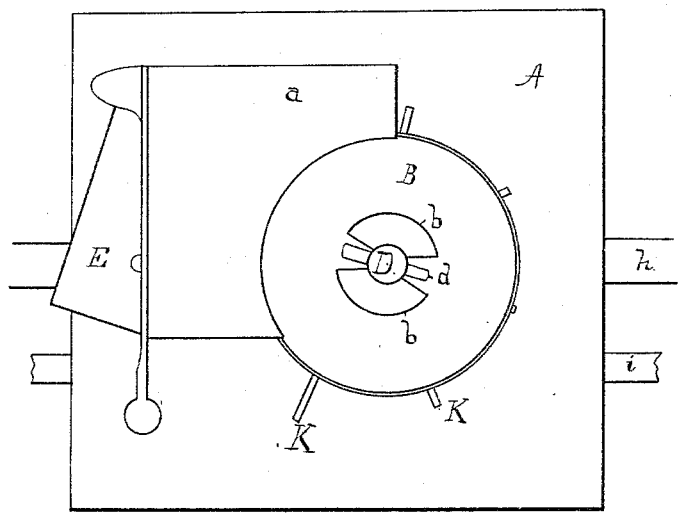
Figure 2:
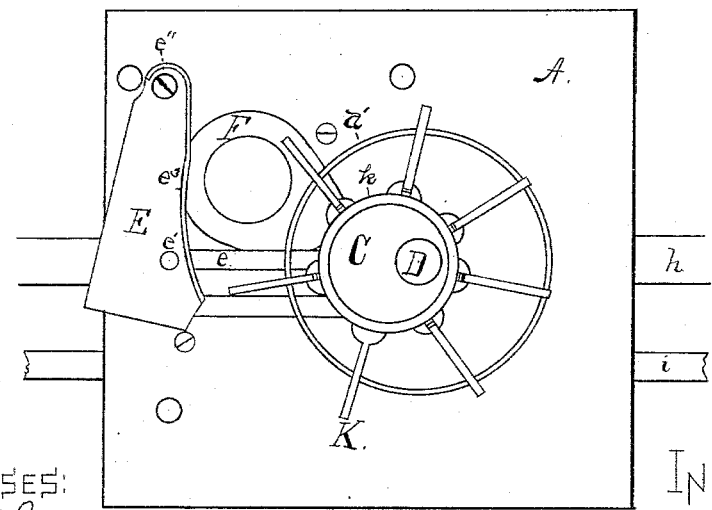
Figure 3:
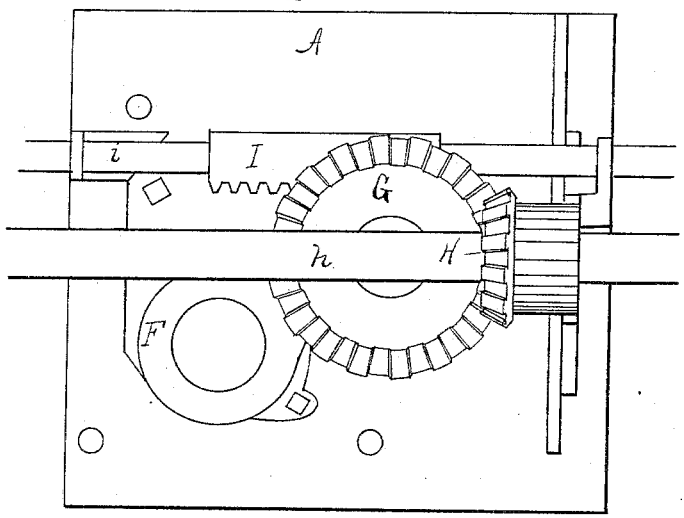
Figure 4:
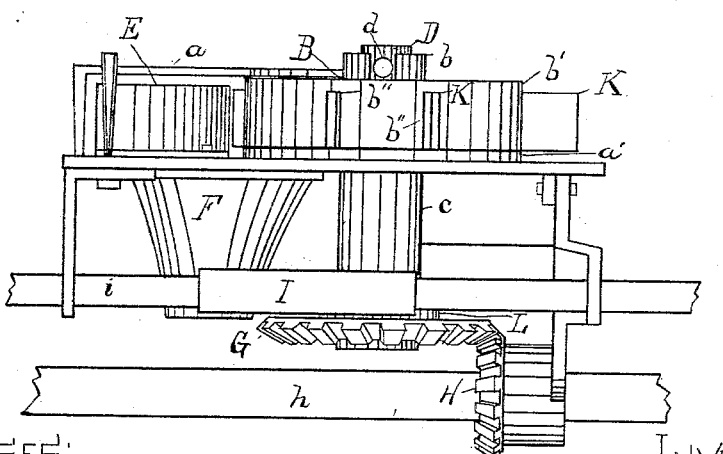
Figure 5:
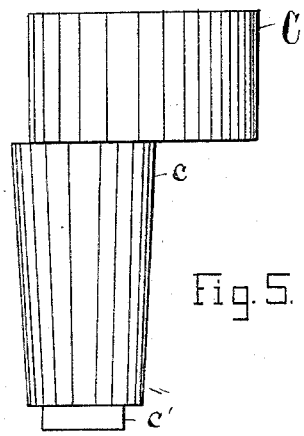
Figure 6:
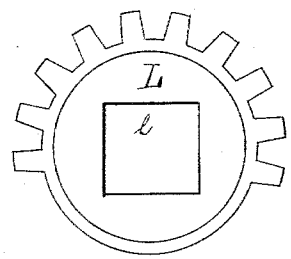
Figure 7:
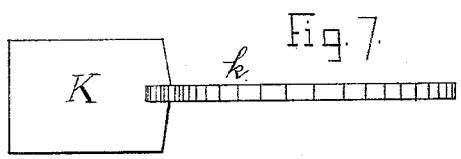
Figure 8:
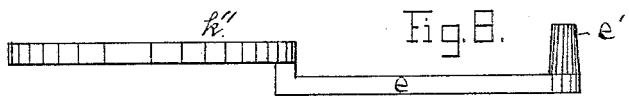
Figure 9:
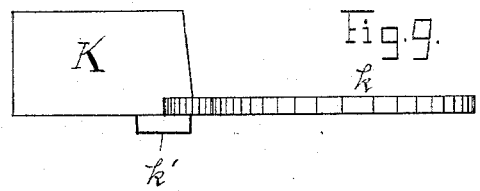

In the drawings, Figure 1 is a top view of my improved fertilizer-feed. Fig. 2 is a top view of the same, with the disk and cover removed. Fig. 3 is a bottom view. Fig. 4 is a rear elevation. Fig. 5 is a detailed view of the cam, hereinafter described. Fig. 6 is a plan view of the gear-segment which operates said cam. Fig. 7 is a side view of one of the rings which revolves about the cam and its feeding-knife. Fig. 8 is a view of the bottom ring and its arm which engages with the guard-plate. Fig. 9 is a side view of the lowest ring carrying a feeding-knife, showing also the depending scraper.

Similar letters represent like parts in the several figures.

A represents the plate, which forms the bottom of the hopper in which the fertilizer is carried. This hopper, or a series of these hoppers, can occupy any convenient position upon the machine; but a position just before or just behind the seed-hopper is considered preferable.

B represents a circular disk having the depending flange or rim $b'$, which is provided with the slots $b''$, within which the knives K operate. This disk B is also provided with the two lugs $b$ upon its upper surface, which engage with the pin $d$ upon the shaft D. This vertical driving-shaft D is provided at its lower end with a beveled gear-wheel, G, which meshes into the pinion H upon the driving-axle $h$, which axle is caused to revolve through any suitable connection with the wheels or wheel-axle. The cam C, and its lower projection or arm, $c$, are provided with a circular orifice which receives the shaft D, as shown in Fig. 2, which is secured in place by the pin $d$. The lower end, $c'$, of the depending arm $c$ of the cam C, is made square or with some other angular conformation to fit into a like opening, $l$, in the center of the gear-segment L, (shown in Fig. 6,) the segment L being held in place by the gear G. The rod $i$ bears rigidly attached upon it the rack I, which engages with the segment L.

F represents the distributing aperture, from which the fertilizing material is conveyed by any suitable devices to the drill-tooth.

K K represent the feeding-knives, each being attached to an independent ring, $k$, which revolves about the cam C. These knives K are so attached to the rings $k$ that their lower edges ride upon the surface of the circular flange $a'$ upon the bottom plate, A. The lower ring, having a knife attached, has a scraper, K', (see Fig. 9,) depending therefrom, which rides upon the bottom plate within the flange $a'$, and serves to carry all particles of the fertilizer which may have been carried within the disk B to the discharge-opening F, which extends to within the flange $a'$. (See Fig. 2.)

E represents the guard-plate, having the raised edge or flange $e^3$, which serves to prevent the fertilizing material falling into the discharge-opening F from the side. This plate is pivoted to the plate A by the pivot $e''$, and is caused to move upon said pivot by the movement of the cam C, through the instrumentality of the ring $k''$, (which encircles the said cam and rests upon the bottom plate, A,) the arm $e$ and pin $e'$, which are shown in detail in Fig. 8, and in combination in Fig. 2.

The cover *a* serves to prevent the fertilizing material from falling by gravity into the discharge-opening, thus restricting the amount of fertilizer fed to the amount carried to the said opening F by the feeding-knives K.

In operation the shaft *h* is revolved by the ground-wheels or axle, or in any other suitable manner, thereby revolving the pinion H, which causes a revolution of the gear G and shaft D, to which it is rigidly attached. The pin *d*, which passes through the shaft D at its upper end, and serves to retain the parts in position, now engages with the lugs *b* on the disk B, thereby causing said disk to revolve and carry with it the feeding-knives K; but these knives K revolve about a different center from that of the disk, to wit, the center of the cam C, so that at one point in the revolution the knife-blades extend outside of the disk B, and at the opposite point are almost wholly within the said disk. Thus the knives, during each revolution, pass in and out through the narrow slots *b″* in the flange *b′* of the disk B, and the fertilizing material is scraped from their surfaces by the sides of the slots, and any clogging or banking up is effectually prevented. When the knives are withdrawn within the disk more or less of the fertilizer will pass through the slots and fall within. This is removed by the scraper *k′*, depending from the lower knife-bearing ring *k*, which carries the fertilizer around to the discharge-opening F, which extends some distance to within the ring *a′*, as shown in Fig. 2.

The amount of fertilizer carried to the discharge-opening F may be varied at will by varying the position of the cam C upon the shaft D, with reference to the said opening F. This is done by the movement of the rod *i*, which bears the rack I, engaging with the gear-segment L. The movement of the rack revolves the cam, which can be made to assume any desired position within the disk B, and fastened in that position by any suitable means, preferably applied to the rod *i*. The position shown in Fig. 2 is that in which nearly the maximum amount is fed. If the cam be revolved to a position on the opposite side of the central shaft, D, the amount fed will be the minimum amount.

The arm *e*, which operates the guard-plate E, is preferably turned or bent downward, as shown in Fig. 8, and sets within the recess in the bottom plate formed by attaching the discharge-tube F to said bottom plate, as thereby the scraper *k′* is enabled to ride upon the plate A in its entire revolution, and thus perform its allotted work.

In all fertilizing material there will be found a greater or less quantity of stones and like hard bodies. If such hard substances were to become wedged in between one of the knives and the guard-plate or some other stationary part of the device, the continuous revolution of the disk and knives would result either in breaking the knife or the stationary part against which the hard body presses. It is therefore desirable to provide some means by which the device can automatically prevent such an accident. The means which I provide is shown in the preferable form in the drawings, and consists in the pin *d*, which passes through the revolving shaft D, and by pressing against the lugs *b* upon the disk B, causes the said disk and the feeding-knives to revolve, which pin is constructed of wood or some other material, which an unusual pressure will break. If with this construction any hard body should become lodged between the revolving knives and some stationary part, the continued pressure would break the pin, the disk would stop, when the stone could be removed, and the pin be easily replaced without further damage to the device.

Having thus described my invention, what I claim as new, and desire to secure by Letters Patent, is—

1. In a force-feed fertilizer-distributer, the combination of a revolving disk having a slotted rim, with a series of independent feeding-knives which operate in said slots, each knife being rigidly attached to an independent ring, and a cam upon which said rings revolve, substantially as set forth.

2. In a force-feed fertilizer-distributer, the combination of a revolving disk having a slotted rim and a series of independent feeding-knives which operate within said slots, each knife being attached to an independent ring, with a cam inclosed within said disk, and means for changing the position of the cam within said disk, substantially as and for the purpose set forth.

3. In a force-feed fertilizer-distributer, the combination, with a revolving disk having a slotted rim and independent feeding-knives which revolve about an inclosed cam and operate within said slots, of a pivoted guard-plate having a raised rim, and an arm connecting said guard-plate to the cam, by means of which the guard-plate is retained in a fixed relative position to the feeding-knives, whatever be the rate of feed, substantially as described, and for the purposes set forth.

4. In a force-feed fertilizer-distributer, the combination, with a revolving disk having a slotted rim and an inclosed cam around which a series of feeding-knives revolve, of a depending scraper attached to the lower knife of the series, substantially as and for the purpose set forth.

5. In a force-feed fertilizer-distributer, the combination, with the revolving shaft and the revolving disk, of a frangible pin uniting the same, substantially as and for the purpose set forth.

STACY B. HART.

Witnesses:
T. S. E. DIXON,
E. L. THURSTON.